June 9, 1931.  S. McWADE  1,809,719
SCREW DRIVER
Filed Aug. 31, 1928
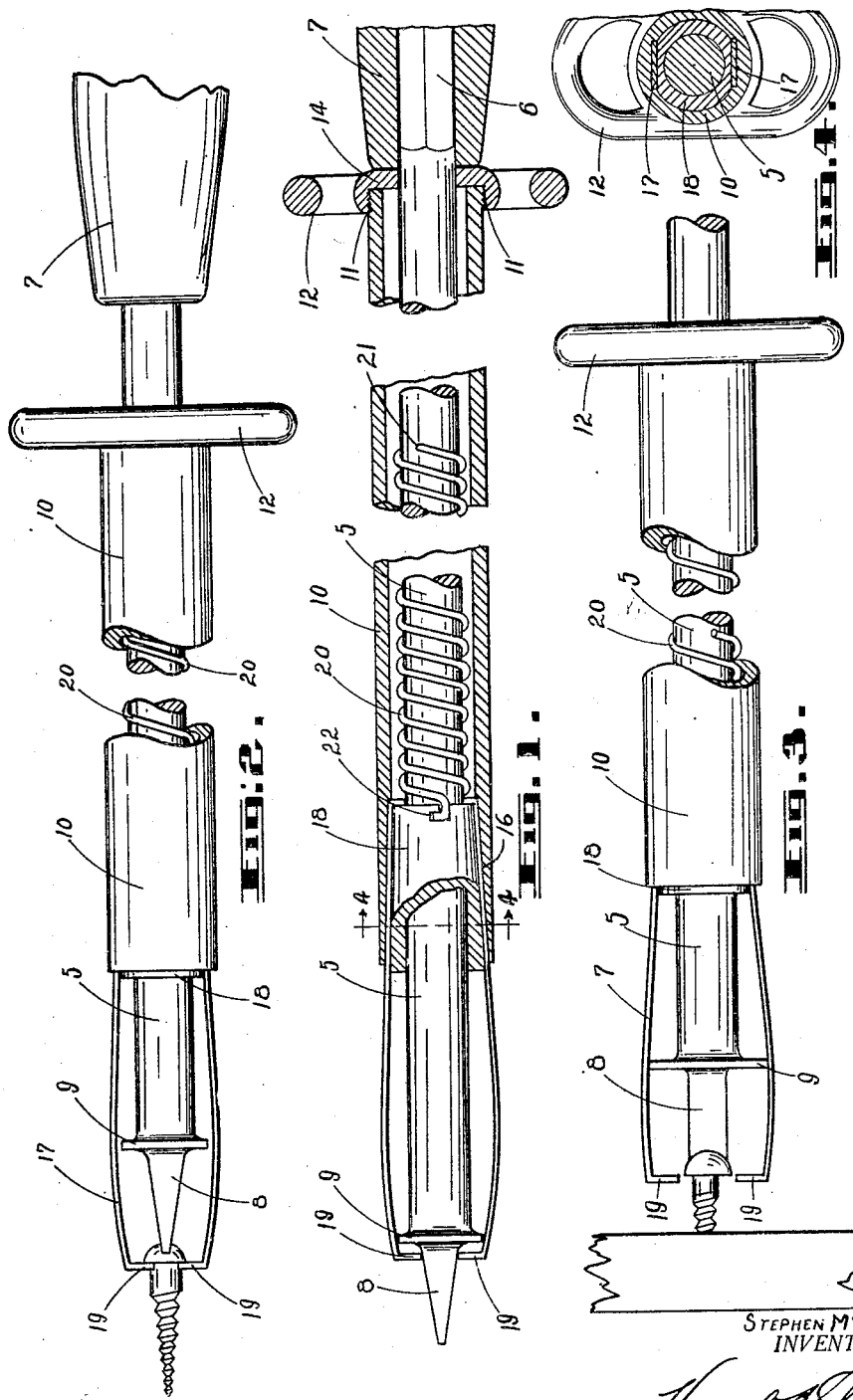
Stephen McWade,
INVENTOR.
BY Harold C. Shipman
ATTORNEY Patented June 9, 1931

1,809,719

UNITED STATES PATENT OFFICE

STEPHEN McWADE, OF COBDEN, ONTARIO, CANADA

SCREW DRIVER

Application filed August 31, 1928. Serial No. 303,293.

This invention relates to screw drivers and more particularly to a construction which may be manipulated to temporarily hold the screw while inserting or when withdrawing the same.

The principal object of my invention is to provide a simple construction, inexpensive to manufacture and which will be easily manipulated to hold a screw with the bit end of the screw driver engageably retained in the screw slot.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a detailed plan view, parts being in section and parts broken away, to more clearly show the various relationship of the co-acting parts.

Fig. 2 is a side plan view, part being broken away, showing the relative position of the various co-acting parts when retaining a screw in the spring jaws.

Fig. 3 is a side plan view, part being broken away, showing the relative position of the various co-acting parts when the spring jaws are spread to release their gripping engagement on the screw.

Fig. 4 is a sectional view taken on the line 4—4 of Fig. 1, looking in the direction of the arrow.

Like numerals of reference designate corresponding parts throughout the different views.

5 indicates a shank member, having a squared end 6 on which a handle 7 is suitably retained. The opposite end of the shank is provided with a tapered bit, having an enlarged portion 9 preferably of rectangular shape in cross section, the corners being slightly rounded off.

10 is a cylindrical casing reciprocally mounted on the shank 5. One end is threaded on its outer contour as at 11 to which is threadably engaged the operating member 12. The outer face of this operating member 12 extends inwardly as at 14 to provide a snug fit bearing on the shank 5. When in normal position, the outer face of this operating member 12 will abut the inner end of the handle 7. The opposite end of the cylindrical casing 10 is reamed out to provide a tapered seat, the purpose of which will hereinafter be mentioned. At diagonally opposite sides of this seat, I provide longitudinal grooves 16 into which is positioned the inner ends of the flat spring jaws 17. The inner end of the jaws are preferably bent at right angles and abut against the shoulder formed at the inner end of their grooves 16. 18 is a plug having a tapered outer contour adapted to be forced into the tapered seat and bind the inner ends of the spring jaws 17 tightly in their respective grooves 16, the inner end of the spring jaws engaging the inner end of the plug 18 to retain them in proper position. The inner contour of the plug 18 is such as to provide a snug fit over the shank 5 and act as a bearing for this end of the cylindrical casing 10. The spring jaws 17 are suitably curved and are provided with inwardly directed free ends 19, which ends extend towards the bit 8 in advance of the enlarged portion 9. 20 is a coil spring around the shank 5, one end of which is bent inwardly and engaged in a suitable opening in the shank as at 21, the other end being engaged in an angular slot 22 formed on the inner end of the plug 18.

The enlarged portion 9 being rectangular in shape will permit the flat springs 17 to normally lie in close contact to the shank 5, so that the free ends 19 will engage the shank of a screw. When the casing 10 is given a quarter turn on the shank 5, the rectangular shaped enlarged portion will cause the spring jaws 17 to be spread apart as shown in Fig. 3. The flat spring jaws 17, lying in flat contact relationship with the flat ends of the enlarged portion 9, will tensionally counteract the tendency of the coil spring 20 to return the casing, a quarter turn, to normal position.

When it is desired to position a screw intermediate the inwardly directed ends 19, the thumb of the operator is pressed against the operating member 12 to push it forward relative to the shank 5 and at the same time rotate it a quarter turn. When this operation has taken place, the operating parts will be in the position as illustrated in Fig. 3, the enlarged portion 9 having spread apart the spring jaws 17 sufficient distance to properly position the head of the screw between the inwardly directed ends 19. The same position is desirous for engaging a screw partially removed from its imbedded position in any material. When the screw is positioned as hereinbefore mentioned, the thumb of the operator is pressed against the protruding end of the operating member 12 so as to give it a reversed quarter turn relative to the shank 5, which will cause the enlarged portion 9 to be positioned as in Fig. 2, permitting the spring jaws 17 to come towards each other, the inwardly directed ends 19 engaging under the head of the screw. The coil spring 20 tensions the bit 8 into the slot of the screw held by the spring jaws 17 and retains the head of the screw against the inwardly directed ends 19 of the spring jaws 17, supported from the cylindrical casing 10. When the screw is engaged sufficient distance into the material, the operating member 12 is again turned a quarter turn by the operator's thumb so as to release the jaws from their engagement of the screw head and permit the inwardly directed ends 19 to return back to normal position relative to the shank 5 as shown in Fig. 1, which when in that position, permit the bit 8 to be used to complete the screwing in of the screw previously started.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

A screw driver comprising a shank, having a handle suitably retained on one end thereof; the other end of said shank being provided with a tapered bit; an enlarged portion adjacent the inner end of said bit of rectangular form in cross section having greater dimensions in one direction than on the transverse diameter; a cylindrical casing reciprocally and rotatably mounted on said shank; separate, removable, flat spring jaws supported from said casing; a tapered plug on said shank adapted to retain said jaws in position relative to said casing and to act as a bearing between said casing and said shank; a recoil spring connected between said shank and said plug adapted to retain said plug in tight position in said casing and to return said casing to normal position relative to said shank; an operating member on said casing adjacent said handle for rotating said casing and said enlarged portion adapted to spread and retain said jaws in spread position upon rotation of said casing a quarter turn and frictionally retaining the casing in fully projected position against the tension of the spring.

In testimony whereof, I affix my signature.

STEPHEN McWADE.